United States Patent
Correl et al.

(10) Patent No.: US 8,056,123 B2
(45) Date of Patent: Nov. 8, 2011

(54) METHOD, APPARATUS AND PROGRAM STORAGE DEVICE FOR PROVIDING SERVICE ACCESS CONTROL FOR A USER INTERFACE

(75) Inventors: Stephen F. Correl, Beaverton, OR (US); Mark C. Davis, Durham, NC (US); Ashitha B. Mollera, Beaverton, OR (US); Martine B. Wedlake, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 10/955,398

(22) Filed: Sep. 30, 2004

(65) Prior Publication Data

US 2006/0075251 A1    Apr. 6, 2006

(51) Int. Cl.
 *G06F 21/00*    (2006.01)
(52) U.S. Cl. ............................ 726/6; 713/184
(58) Field of Classification Search .................. 713/184; 726/6

See application file for complete search history.

(56) References Cited

U.S. PATENT DOCUMENTS

| | | |
|---|---|---|
| 5,550,968 A | 8/1996 | Miller et al. |
| 5,742,683 A | 4/1998 | Lee et al. |
| 6,094,721 A | 7/2000 | Eldridge et al. |
| 6,131,090 A * | 10/2000 | Basso et al. ................ 706/23 |
| 6,601,175 B1 | 7/2003 | Arnold et al. |
| 6,609,198 B1 | 8/2003 | Wood et al. |
| 6,731,731 B1 | 5/2004 | Ueshima |
| 6,792,424 B1 * | 9/2004 | Burns et al. ................. 707/9 |
| 2002/0016922 A1 | 2/2002 | Richards et al. |
| 2002/0023215 A1 | 2/2002 | Wang et al. |
| 2003/0135733 A1 | 7/2003 | Hearn et al. |
| 2004/0003259 A1 | 1/2004 | Chang |
| 2004/0064572 A1 * | 4/2004 | Yamaguchi et al. ......... 709/229 |
| 2005/0004924 A1 * | 1/2005 | Baldwin ..................... 707/100 |
| 2006/0021041 A1 * | 1/2006 | Challener et al. ............ 726/24 |

FOREIGN PATENT DOCUMENTS

| | | |
|---|---|---|
| TW | 550490 | 9/2003 |
| TW | 567429 | 12/2003 |

* cited by examiner

*Primary Examiner* — Eleni Shiferaw
*Assistant Examiner* — Tamara Teslovich
(74) *Attorney, Agent, or Firm* — Lieberman & Brandsdorfer, LLC

(57) ABSTRACT

A method, apparatus and program storage device for providing service access control for a user interface is disclosed. A service secret is combined with a user access code, such as a user ID/password. A system can extract the service secret and determine whether access to service functions should be allowed to provide authentication and authorization for service interface access in secure manner.

12 Claims, 6 Drawing Sheets

METHOD, APPARATUS AND PROGRAM STORAGE DEVICE FOR PROVIDING SERVICE ACCESS CONTROL FOR A USER INTERFACE

BACKGROUND OF THE INVENTION

1. Field of the Invention

This disclosure relates in general to computer security, and more particularly to a method, apparatus and program storage device for providing service access control for a user interface.

2. Description of Related Art

Computer security is the process of preventing and detecting unauthorized use of computers and networks. Prevention measures help in stopping the unauthorized users (also known as "intruders") from accessing any part of a computer system or network. Detection involves the determination of whether or not someone attempted to break into a computer system or network, if they were successful, and what they may have done.

The Internet and the World Wide Web (WWW) have provided data processing system users with what is effectively a global communication network interconnecting a vast number of databases and other network users. The local link between the network and the user is typically by way of a high speed Internet connection. There are many different types of high-speed internet access services including DSL, ADSL, SDSL, cable and satellite. There are many major benefits to high-speed (broadband) internet access. One huge benefit is that you get an always-on connection to the internet. This means that there is never a need to dial in and you will never have to worry about busy signals. Instead you have a constant connection to the Internet whenever your computer is on.

However, because a user's workstation is coupled directly to such communication interfaces, any network user ostensibly has the ability to access any information resource coupled to a network node. Because the network provides a potential window into any information resource linked to any of its nodes, it is customary to protect all communications using a security system to protect against the unauthorized access to another system resource (e.g., another computer).

The concepts behind network security break nicely into four categories: Authentication, Authorization (a.k.a. Access Control), Accounting, and Secure Communications. Authentication is simple verification of a user's identity. Always based on some form of trust, authentication relies on something that the user has, which can be compared to a known constant (the trusted value). This can occur either in an interaction with the user (a user ID and password are entered), or can range up to complex biometrics systems like fingerprint identification, face recognition or retinal scans. Authentication also can occur by proxy, such as a stored authentication token (kept in a workstation's memory while the user remains logged in, or on a token such as a smartcard).

Authorization, also known as access control, decides who is allowed where. File permissions are a good example of access controls. Usually stored in resource-level ACLs (access control lists), these are simply lists of authenticated users (or groups of users) who are allowed to access or are barred from accessing a given resource. This is usually the most complex aspect of network security since it requires the secure, centralized storage and access of these ACLs. Authorization can occur only once a user is authenticated, as authorization systems rely on lists of authenticated users.

Accounting involves the basic task of recording who accessed what resource. Most network operating systems and services include some form of logging. This can either be performed independently at each service, or through a centralized accounting server. However, if performed centrally, all accounting information must be transferred securely, and can be affected by denial of service attacks (for instance, a hacker wishing to cover his tracks could prevent logging messages from reaching the accounting server).

Secure communications involves the ability to protect network transmissions from both interception (where private information can be compromised) as well as unauthorized transmission, where a hacker can masquerade as a secure host, or can insert data into an established connection.

In present day networks and computer systems, the need for privacy and proper authentication of the network and computer users is one of the foremost areas of concern. In many software systems the customer, or user, initiates actions through a user interface. The right to access the interface is commonly authenticated and authorized (also referred to as auth2) by accepting a userID and password, and comparing these to valid userIDs and passwords. Valid userID/passwords are typically stored in a directory server or verification reference such as LDAP, Kerberos, etc.

In addition to typical customer users, service people often need access to the customer's system in order to perform various maintenance or diagnostic support functions. Service access is a concern to customers because it usually implies granting to an outsider the capability to see or modify confidential data, or modify the state of a sensitive system in a manner not possible through customer interfaces.

Service access is sometimes provided through a separate interface (portal) to the system, rather than through the user interface. Sometimes service access is through the user interface but involves the use of special service codes or commands (that customers are not given). Service access is typically intended to be restricted to service personnel only. Service commands are sometimes undocumented, or hidden by "trap doors" in user interfaces, or use separate interfaces not readily available to customers.

There are many ways to implement secured service access. For example, secured service access may be provided using passwords that are based on time, authorization systems that require presentation of two separate credentials, and systems that control access level depending on the authentication credentials. Methods that use time-based passwords involve the computation of passwords based on time, or for incorporating references to time into passwords. These ideas enable passwords to only be valid for a limited interval. Dual authorization schemes require two forms of credentials at the same time; e.g. the user must supply a password in combination with an electronic key fob. These methods increase the security of the system by adding a physical requirement, or requiring participation from more than one party. A combined access and authentication scheme provides for controlled access to a system, wherein the type and scope of access depends on the user authentication credentials presented.

However, such systems and techniques present several undesirable security vulnerabilities. For example, customers may learn to access the service portal by observing service people. These customers may then use the service portal to access dangerous commands, commands that compromise system vendor internal information, or commands that compromise the reliability of the system. Further, hackers may use the service portal to compromise the system. Unauthorized users can enter the system and learn enough to break into the user interface. Control over authentication and authorization (auth2) may be weakened if provided in a separate interface. Authorized users can use the service interface to gain access to unauthorized capabilities. The customer must give service people poorly restricted access to the system in order to give them service access.

Interactive computer systems share data among the various applications, components and nodes. In an interactive software system it is problematic to partition the user interface from the service interface. Today, service access control methods have drawbacks in terms of engineering effort, security, auditability, ease of automated scripting, and/or non-repudiation, i.e., preventing the user from denying earlier access authorization.

For example, prompting for service auth2 separately from user auth2 makes scripting more complicated. A special service interface, or service enabling switch, compromises security, since its existence advertises additional avenues of attacking the system. Since typically customers are not intended to access the service interface, if they do somehow gain access, that access is usually not subject to the identical controls as the user interface. Moreover, requiring the user to grant auth2 credentials to the service people gives full visibility of service access to the system. It also means the user cannot repudiate having granted the access.

It can be seen then that there is a need for a method, apparatus and program storage device for providing service access control for a user interface.

SUMMARY OF THE INVENTION

To overcome the limitations described above, and to overcome other limitations that will become apparent upon reading and understanding the present specification, the present invention discloses a method, apparatus and program storage device for providing service access control for a user interface.

The present invention solves the above-described problems by combining a service secret with a user access code, such as a user ID/password. The system can extract the service secret and determine whether access to service functions should be allowed. Thus, the combination of the service secret and user access code solves the problem of authenticating and authorizing service interface access in such a way that the disadvantages inherent in combining service and regular user interfaces are avoided.

A data structure in accordance with an embodiment of the present invention includes a user password identifying a user requesting access to a computer system and a service secret for use in authenticating and authorizing access to service functions of the computer system.

In another embodiment of the present invention, a computer system is provided. The computer system includes an authentication and authorization device and a portal for entering access information, wherein the access information includes a user password identifying a user requesting access and a service secret for requesting access to service functions, and wherein the authentication and authorization device tests the access information for the presence of the service secret and grants access to service functions when a service secret extracted from the entered access information is validated.

In another embodiment of the present invention, a program storage device is provided. The program storage device includes program instructions executable by a processing device to perform operations for providing service access control for a user interface, the operations including receiving access information, determining whether the access information includes a service secret and providing an access role corresponding to the access information including authorization to service operations when a service secret is included with the access information.

In another embodiment of the present invention, another program storage device is provided. This program storage device includes program instructions executable by a processing device to perform operations for providing service access control for a user interface, the operations including testing supplied access information for the presence of a service secret, setting a service flag and removing the service secret from the access information when a service secret is detected and requesting identification of an access role associated with the access information.

In another embodiment of the present invention, a method for providing service access control for a user interface is provided. The method includes receiving access information, determining whether the access information includes a service secret and providing an access role corresponding to the access information including authorization to service operations when a service secret is included with the access information.

In another embodiment of the present invention, another method for providing service access control for a user interface is provided. This method includes testing supplied access information for the presence of a service secret, setting a service flag and removing the service secret from the access information when a service secret is detected and requesting identification of an access role associated with the access information.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing service access control for a user interface. The present invention combines a service secret with a user access code, such as a user ID/password. The system can extract the service secret and determine whether access to service functions should be allowed. Thus, the combination of the service secret and user access code solves the problem of authenticating and authorizing service interface access in such a way that the disadvantages inherent in combining service and regular user interfaces are avoided.

Figure 1:
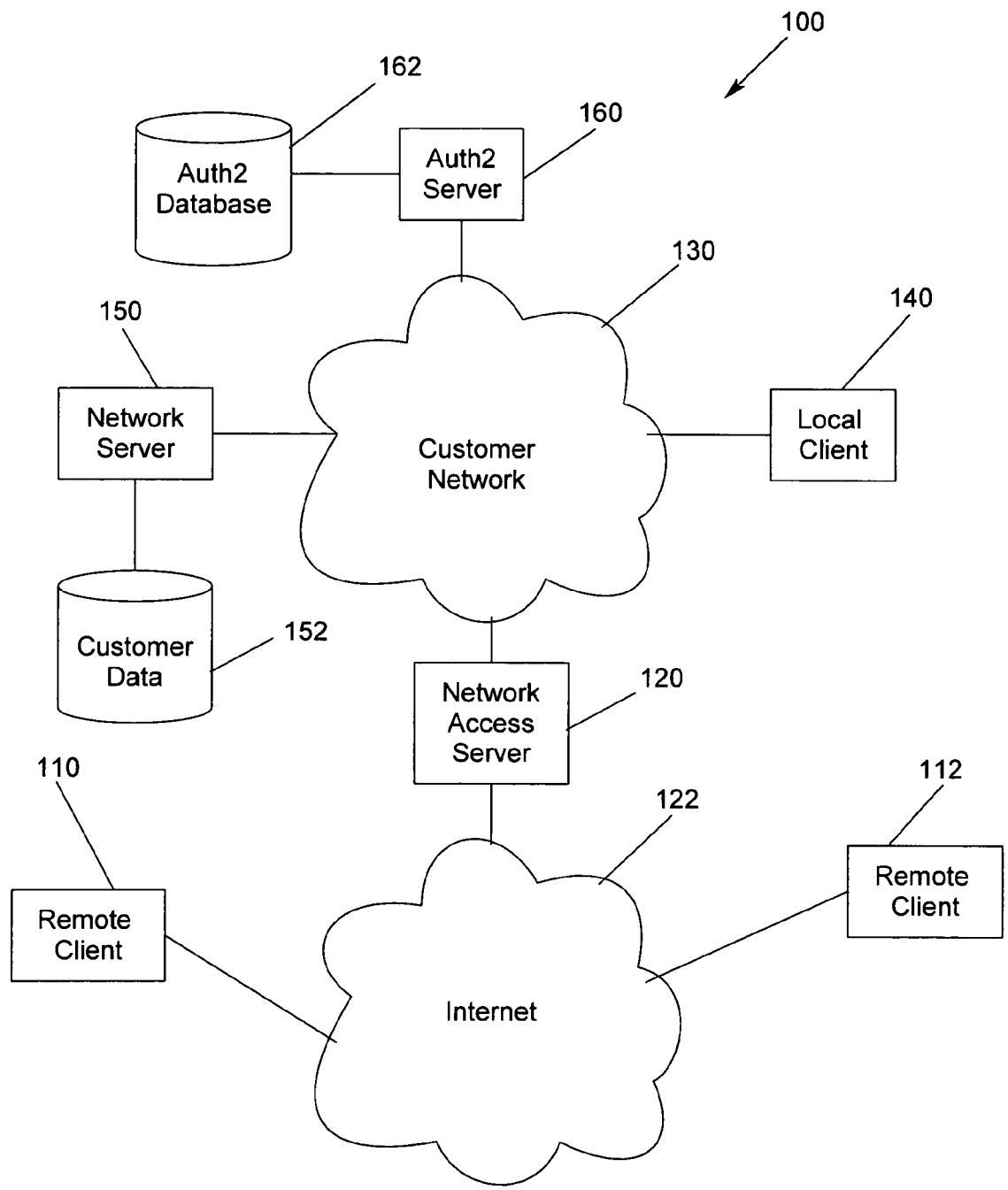
FIG. 1 illustrates a computer system for providing service access control for a user interface according to an embodiment of the present invention.

FIG. 1 illustrates a computer system 100 for providing service access control for a user interface according to an embodiment of the present invention. In FIG. 1, remote clients 110, 112 are coupled to a network portal, e.g., through a network access server 120 via a network 122, e.g., the Internet. The network access server may be coupled to a customer network 130. Local clients 140 also provide a portal to the customer network 130. A network server 150 provides access to customer data 152. An authentication and authorization (Auth2) server 160 is coupled to the customer network 130 for granting access to the customer data and network server via valid user IDs and passwords. An authentication and authorization database 162 stores data for verifying a user's identity and for deciding what access verified users have.

Figure 2:
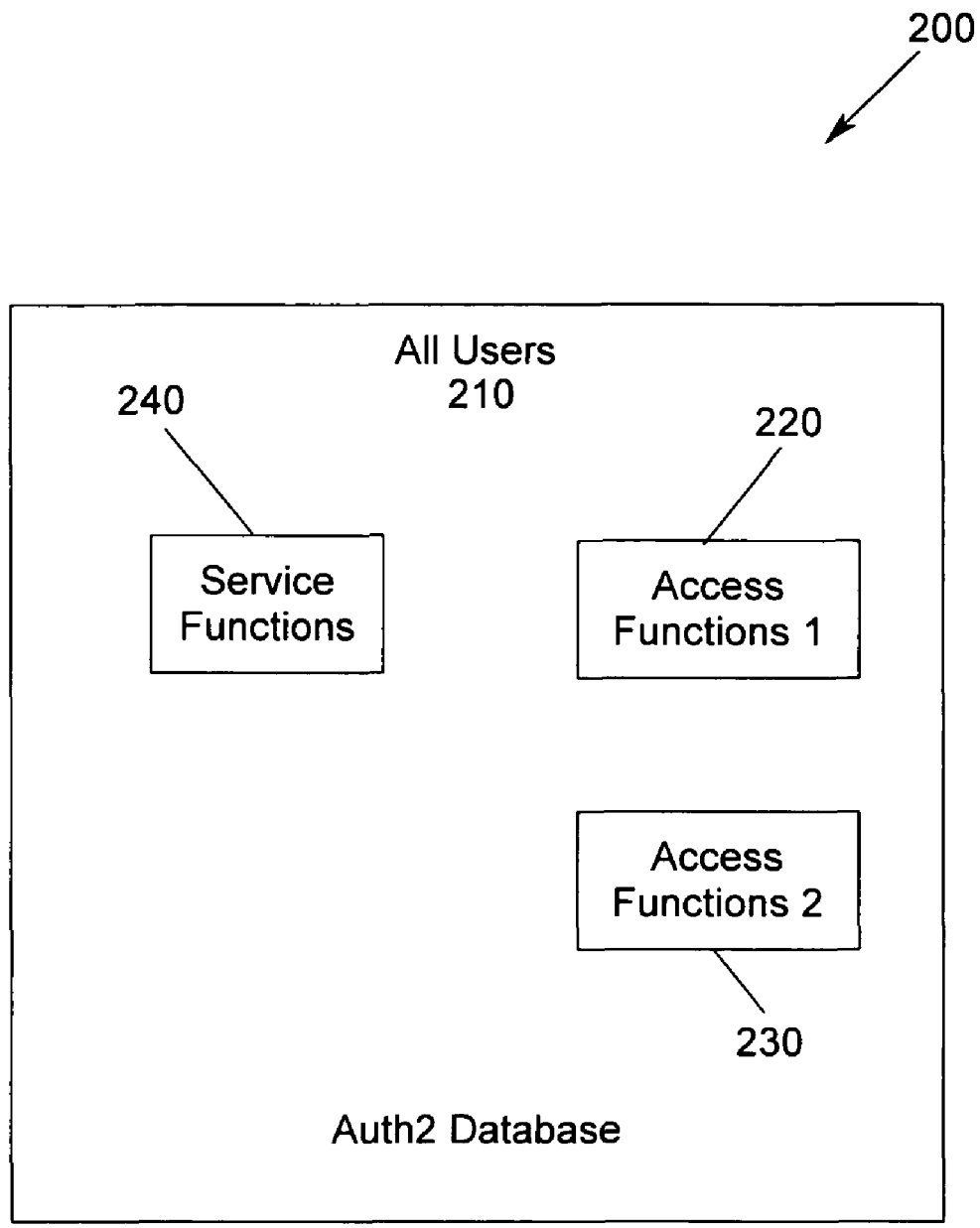
FIG. 2 illustrates an example of an authentication and authorization database according to an embodiment of the present invention.

FIG. 2 illustrates an example of an authentication and authorization database 200 according to an embodiment of the present invention. In FIG. 2, the authentication and authorization database 200 represents the class of all valid users 210. Within the class of all valid users 210, subsets may be provided. For example, some users may be a member of a subset that may access a first set of functions or data 220. A second subset of users may access a second set of functions or data 230. Further, the authentication and authorization database 200 includes information for verifying and authorizing access to service functions 240 according to an embodiment of the present invention.

Figure 3:
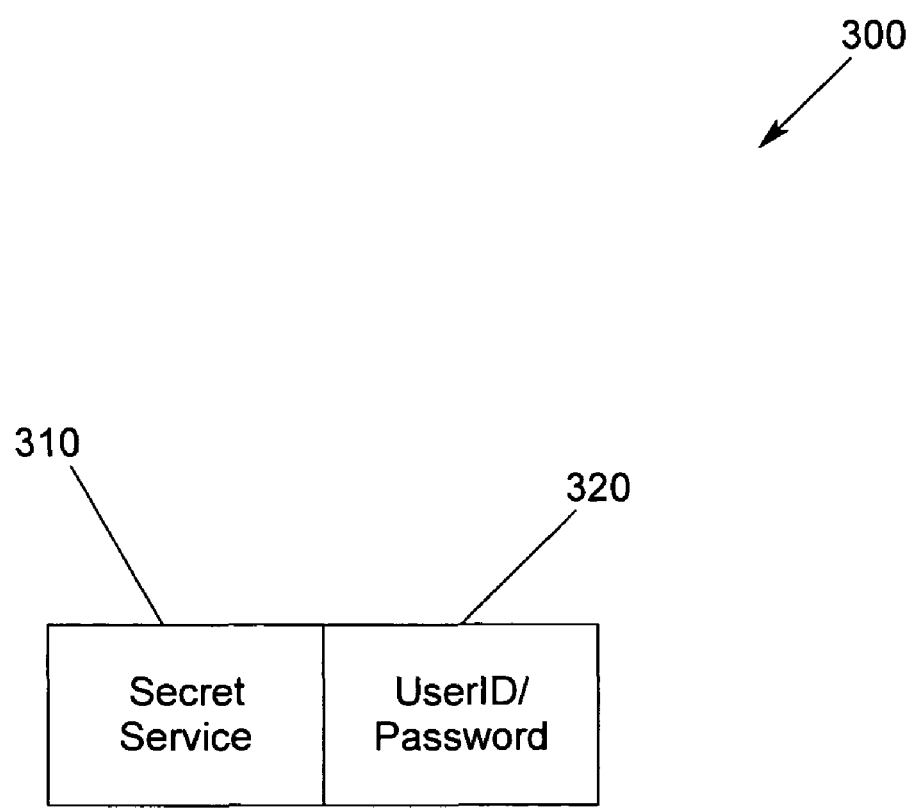
FIG. 3 illustrates a data structure for combining a service secret with a standard user password according to an embodiment of the present invention.

According to an embodiment of the present invention, a service secret is combined with a standard user password to enable the system to detect service authorization and authentication without requiring any external indicia of service portal existence. FIG. 3 illustrates a data structure 300 for access information according to an embodiment of the present invention. Access information is provided in a data structure 300 that combines a service secret with a standard user password. In FIG. 3, a data structure includes a service secret 310 a user password 320. In one embodiment of the present invention, the service secret is obtainable only from a third party such as a system supplier or manufacturer. The presence of the service secret 310 in the compound password 300 can be detected by the system. The effect of the combination of the service secret 310 and user password 320 in the compound password 300 can be reversed by the system to yield the original user password. Combining a service secret with a standard user password enables a regular user interface to support service functions without any negative impact, such as compromised security or an extra authentication challenge. The method also allows the incorporation of time-based secrets in a manner that does not compromise security.

While FIG. 3 shows a concatenation of a service secret 310 and a user password 320, those skilled in the art will recognize that other methods of combining the service secret 310 and user password 320 may be utilized including mathematical transformations. For example, there are many kinds of transformations known in mathematical theory to meet these requirements. Some transformations are more sophisticated than others. A first simpler method is to concatenate the user password with the service secret. For example, if the user password is "foo" and the service secret is "2701" the compound password might be "foo.2701". The advantage of a simple transformation is that it can be performed mentally by the service person. The disadvantage is that it leaves the service secret more vulnerable to discovery by non-service people.

A more complicated example involves combining the service secret with the user password using logical XOR (exclusive-OR). The secret 310 may be a sequence of 4-bit groups. The successive characters of the user password 320 would be considered using their least significant 4 bits. The compounded password 300 would be formed by XORing each group of the secret 310 with each character in the password 320, and pre-pending a flag character such as '.'. For example, if the secret 310 were 0xBEEF and the user password 320 were (ascii) "hush!", the compound password would be ".g{ }g!". The leading dot hints to the system to extract a service secret 310. The system XORs 0xBEEF with "g{ }g!" yielding "hush!". In this scenario, the service person might access a secure web site to compute the compound password 300.

To further limit access by service personnel, the service secret 310 may be time-based to facilitate its distribution to service people. The requirement here is that the system and the service organization are able to independently compute the service secret based on approximately equal values of the current date or time.

Again, some methods for computing a time-based secret may be more sophisticated than others. For example, a simple pseudo-random function taking as its seed the current date can produce a service secret that appears random to casual inspection and requires no other input besides the date. More specifically, a time-based secret may be derived by computing $(((Y*1000+J)*17) \bmod 65533)$, where Y is the year, J is the Julian date. This function can be computed in a simple shell script.

Depending on the system, it may be necessary to allow for system time to differ somewhat across systems. In this case, for authentication purposes, the system may compute service secrets based on several different system times and accept any one of those secrets. For example, if the service secret is computed from the epoch date, the system could accept secrets based on yesterday's, today's, and tomorrow's epoch dates.

Figure 4:
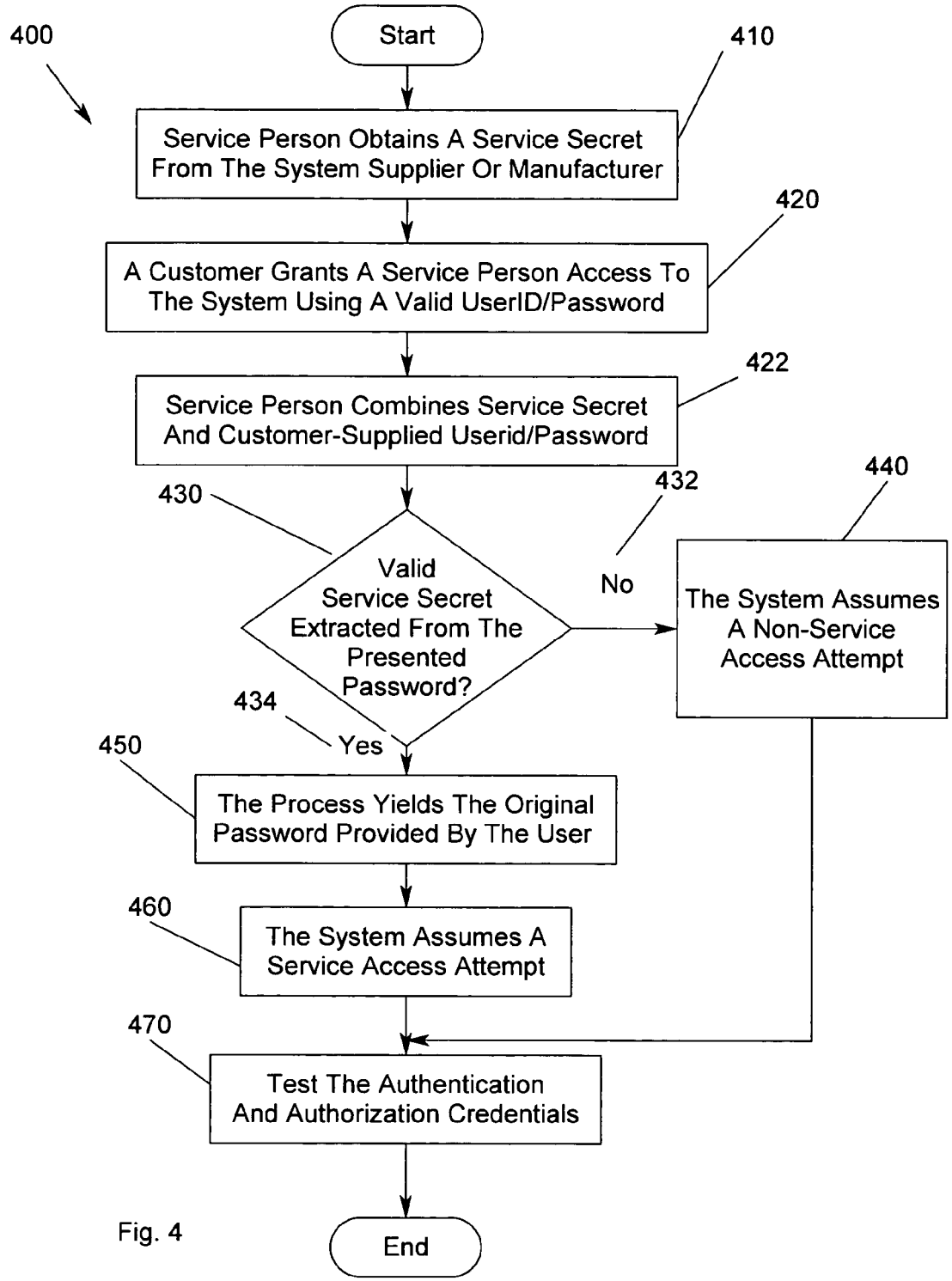
FIG. 4 is a flow chart of a method for providing service access control for a user interface according to an embodiment of the present invention.

FIG. 4 is a flow chart 400 of a method for providing service access control for a user interface according to an embodiment of the present invention. First, a service person obtains a service secret from an independent source, e.g., the system supplier or manufacturer 410. As described above, a time-based service secret can be used, which simplifies distribution since it can be computed and distributed without reference to a specific customer system. Further, if compromised, the secret is only good for a limited time, in conjunction with the user authentication and authorization credentials, so fewer safeguards are needed in its distribution.

Next, a customer grants a service person access to the system using a valid userID/password 420. Since access to the system is entirely under user control in the standard fashion, there is no need for a service portal disabling switch, and the customer can track service access.

The service person combines the service secret with the valid userID/password to yield a new password and presents the new password in combination with the userID to access the system via the user interface 422 Since the two secrets are combined externally to the software system, prompting for a separate service authentication step is unnecessary. No special service authorization protocol is needed in scripts thereby simplifying scripting.

The system determines whether a valid service secret may be extracted from the presented password 430. If it fails 432, the system assumes a non-service access attempt 440 and tests the authentication and authorization credentials 470. If the system finds a valid service secret 434, the process also yields the original password provided by the user 450. The system assumes a service access attempt 460. The password is used to test the authentication and authorization credentials 470. Since in either case the system ends up doing standard the authentication and authorization checking, the service access system requires no special steps from the customer, yet gives no unauthorized access to service functions. After authentication of the user by this method, the capabilities of the logged on user may be augmented with access to the service functions not available to the customer user.

Figure 5:
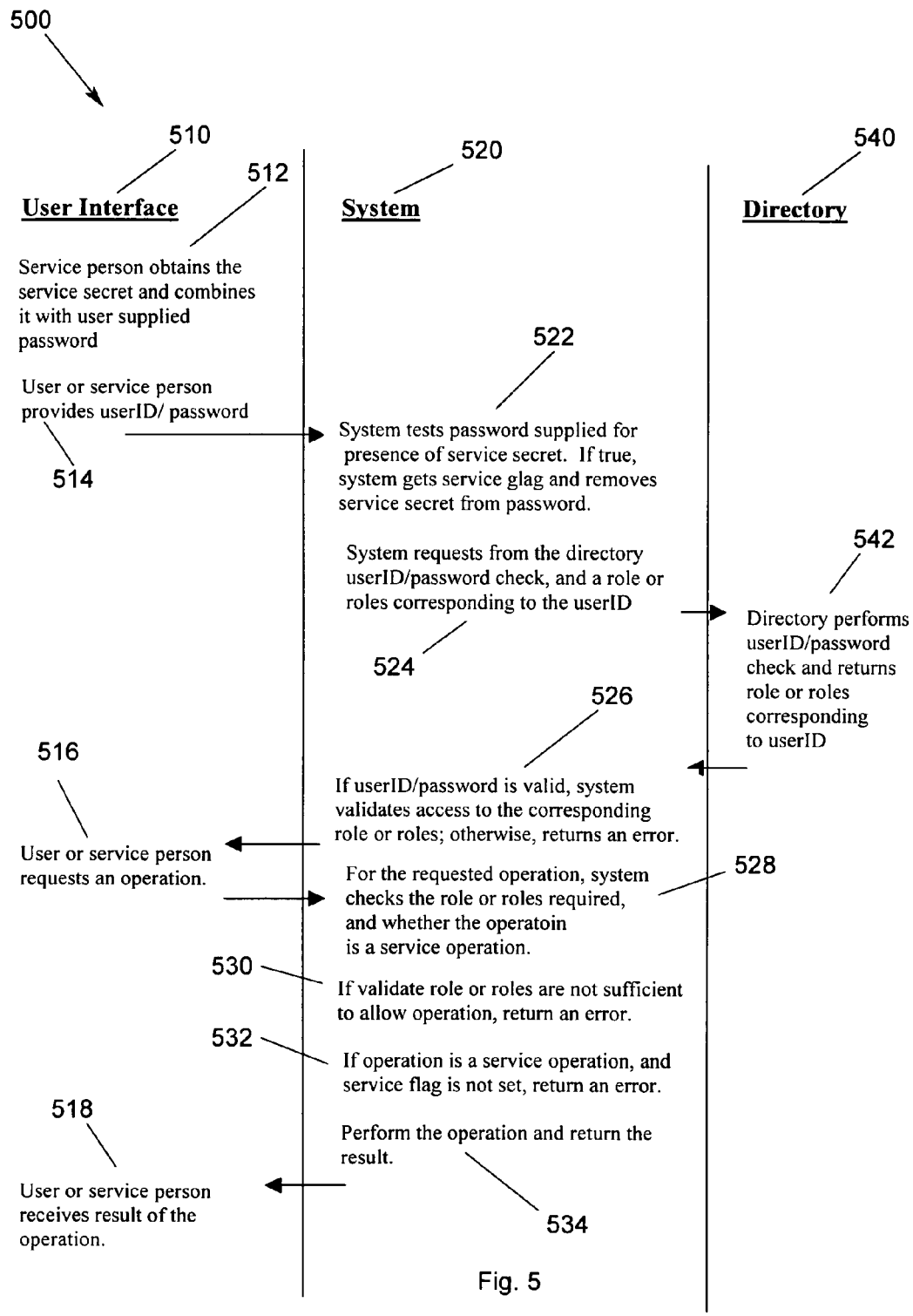
FIG. 5 is a flow diagram illustrating a typical user interface for an authentication and authorization sequence according to an embodiment of the present invention.

FIG. 5 is a flow diagram 500 illustrating a typical user interface for an authentication and authorization sequence according to an embodiment of the present invention. In FIG. 5, actions taken in the user interface 510, the system 520, and the authentication and authorization directory 540 are shown. The time sequence proceeds from top to bottom. Arrows show transfer of control. First, a service person obtains a service secret and combines it with a user-supplied password 512 A user or service person provides a user ID and password to the system 514. The system tests the password supplied by the user or service person for the presence of a service secret 522. If a service secret is detected, the system sets the service flag and removes the service secret from the password. The system requests from the authentication and authorization directory a user ID and password check and identification of an access role associated with the user ID and password 524. The directory performs user ID and password check and returns the access role corresponding to the user ID to the system 542.

If the user ID and password is valid, the system validates access to the corresponding role; otherwise, the system returns an error message to the user or service person 526. The user or service person then requests an operation 516. The system checks the role required for performing the requested operation and whether the operation is a service function 528. If validated role is not sufficient to allow the operation, an error is returned to the user or service person 530. If the operation is a service operation, and a service flag is not set, an error is returned to the service person 532. Otherwise, the operation is performed and the result is returned to the user or service person 534. The user or the service person receives the result of the operation 518.

Accordingly, the customers' use of the service interface is controlled because they would have to learn the algorithm for generating service secret passwords in order to gain consistent access. No externally visible indication of the service interface is given. A special service interface, or service enabling switch, compromises security, since its existence advertises additional avenues of attacking the system. A system according to an embodiment of the present invention provides a single authentication and authorization step from the user interface perspective, whereas prompting for service authentication and authorization separately from user authentication and authorization makes scripting more complicated. Requiring the user to grant authentication and authorization credentials to service people gives full visibility of service access to the system. It also means the user cannot repudiate having granted the access.

A system according to an embodiment of the present invention allows service and user joint control over service access. Some service access portals circumvent user authentication and authorization, which is undesirable for many users. Thus, the present invention prevents the security of a user's system from becoming weakened if non-service people learn the service authorization secret. Use of the user authentication and authorization for service access means a variety of user-controlled authorization levels can be supported. Further, an embodiment of the present invention allows a time-based service secret without compromising security of the system. A time-based service secret is easy to generate and can be centrally distributed.

Those skilled in the art will recognize that the above examples of embodiments of the present invention as described with reference to FIGS. 4 and 5 are not meant to limit the invention to performance of functions by specific types of persons. For example, while a service person is described as obtaining a service secret and combining the service secret with the valid userID/password, the invention may be implemented in a manner that allows an additional and/or alternative person to perform a function described above. For example, an employee of the customer may be designated and have the responsibility of system maintenance and therefore function as a service person. Yet, all non-service users, which would include other customer users will not have the ability to obtain a service secret and therefore will not be provided access to the service functions.

Figure 6:
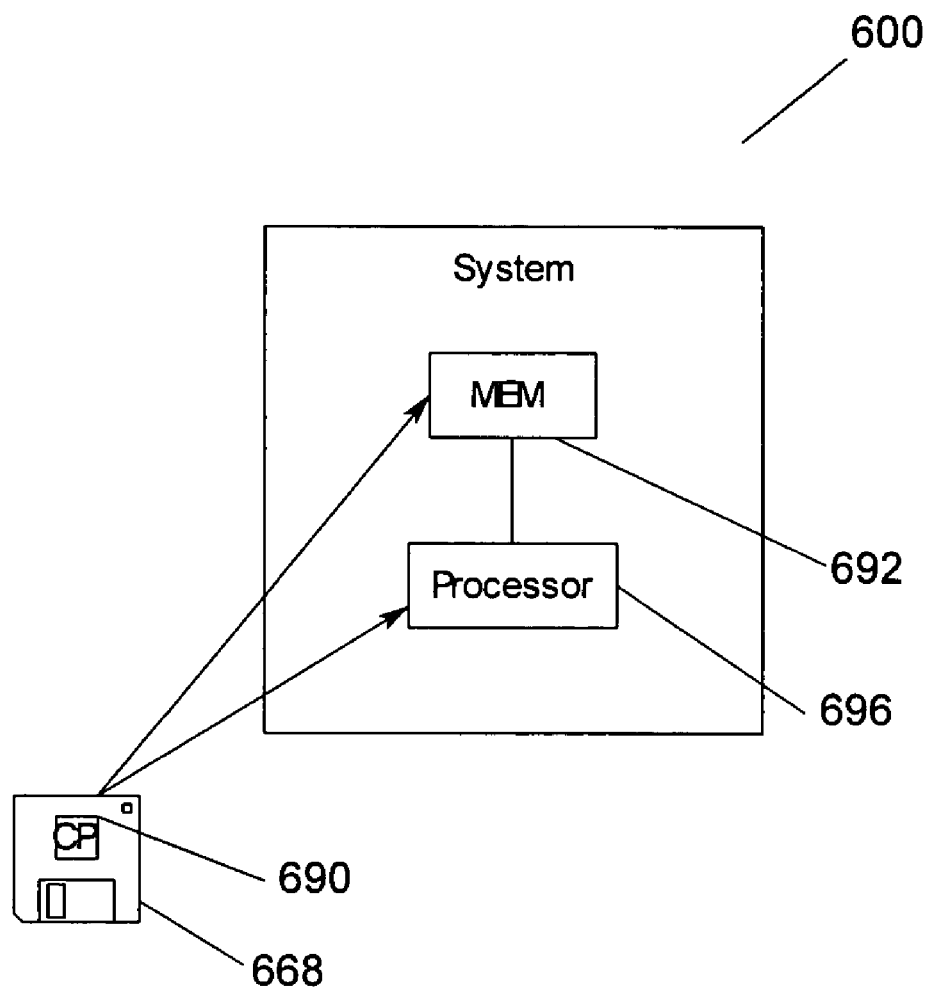
FIG. 6 illustrates a system according to the present invention, wherein the process illustrated with reference to FIGS. 1-5 may be tangibly embodied in a computer-readable medium or carrier.

FIG. 6 illustrates a system 600 according to the present invention, wherein the process illustrated with reference to FIGS. 1-5 may be tangibly embodied in a computer-readable medium or carrier, e.g. one or more of the fixed and/or removable data storage devices 668 illustrated in FIG. 6, or other data storage or data communications devices. A computer program 690 expressing the processes embodied on the removable data storage devices 668 may be loaded into the memory 692 or into the controller system 600, e.g., in a processor 610, to configure the controller system 600 of FIG. 6, for execution. The computer program 690 comprise instructions which, when read and executed by the controller 600 of FIG. 6, causes the controller system 600 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing service access control for a user interface, comprising:
receiving access information, wherein the access information is a combination of two elements combined external to a computer system, the elements including a service secret obtained from a source external to the computer system and a password;
determining validity of the service secret of the received access information, wherein said service secret is an authentication element separate from the password that in combination with the password provides access to a service function of the computer system, and said service secret is in a format selected from the group consisting of: alphanumeric characters and bit groups;

providing an access role corresponding to the access information including authorization to service operations when said service secret included with the access information is determined valid.

2. The method of claim 1, wherein the providing an access role corresponding to the access information including authorization to service operations when said service secret included with the access information is determined valid further comprises identifying a request is for a service access attempt, comparing the service secret and password to entries in an authentication and authorization database and returning the access role corresponding to the password and, when included in the access information, the service secret.

3. The method of claim 1, wherein the providing an access role further comprises setting a service flag and removing the service secret from the access information when the service secret is detected.

4. The method of claim 3, further comprising validation access according to the access role returned in response to the request, else providing an error message.

5. The method of claim 4, further comprising:
receiving a request for an operation;
checking a role required for performing the requested operation and whether the operation is a service function; and
returning an error when the provided access role is not sufficient to allow the operation, returning an error when the operation is a service operation and a service flag is not set, else performing the operation and returning the result of the operation.

6. The method of claim 1, further comprising combining said user password and said service secret to yield a new password.

7. The method of claim 6, wherein the step of combining the user password and service secret is conducted by a service person externally to a software system local to said user interface.

8. The method of claim 1, wherein said service function is selected from the group consisting of: maintenance and diagnostic support functions.

9. The method of claim 1, wherein said source external to the computer system is a system supplier.

10. The method of claim 1, wherein said source external to the computer system is a manufacturer.

11. A method for providing service access control for a user interface, comprising:
external to a computer system, combining a service secret with a valid user identifier for yielding a new password, wherein the service secret is obtained from an independent source external to the system, and wherein the service secret is in a format selected from the group consisting of: alphanumeric characters and bit groups;
presenting the new password for system access;
in response to presentation of the new password, determining validity of the service secret within the new password, wherein said service secret is an authentication element separate from the password that in combination with the password provides access to a service function of said computer system; and
providing an access role corresponding to the access information including authorization to service operations when the valid service secret is included with the new password.

12. The method of claim 11, wherein the step of combining a service secret with a valid user identifier for yielding a new password is conducted external to said computer system under consideration for authentication.

\* \* \* \* \*